United States Patent [19]
Yukitomo et al.

[11] Patent Number: 5,907,303
[45] Date of Patent: May 25, 1999

[54] CMA-BASED ANTENNA SYSTEM

[75] Inventors: Hideki Yukitomo; Mitsuru Uesugi; Katsuhiko Hiramatsu, all of Yokohama, Japan

[73] Assignee: Matsushita Electric Industrial Co., LTD., Osaka, Japan

[21] Appl. No.: 08/873,705

[22] Filed: Jun. 12, 1997

[30] Foreign Application Priority Data

Jun. 12, 1996 [JP] Japan .................................. 8-171649

[51] Int. Cl.$^6$ .................................................. G01S 3/16
[52] U.S. Cl. ......................................................... 342/380
[58] Field of Search .................................... 342/380, 383, 342/423

[56] References Cited

U.S. PATENT DOCUMENTS 5,218,359  6/1993  Minamisono ........................... 342/383

FOREIGN PATENT DOCUMENTS 7-162222  6/1995  Japan .
7-336129  12/1995  Japan .
7-336130  12/1995  Japan .

*Primary Examiner*—Gregory C. Issing
*Attorney, Agent, or Firm*—Lowe Hauptman Gopstein Gilman & Berner

[57] ABSTRACT

A CMA-based antenna system is disclosed which shows an improved receiving performance by reducing phase differences in the received signals which have been weighted. The CMA-based antenna system comprises a plurality of antenna, weight circuits, an adder, an error detector and a synthesis controller. The synthesis controller controls the weight circuits so as not only to make the adder output at a preset level but also to cause any differences among the weight circuit outputs not to increase. In order to cope with an error of symbol synchronization and a delayed wave, the CMA-based antenna system may further have a kind of equalizer inserted before the weight circuit in each antenna circuit.

7 Claims, 6 Drawing Sheets

$a0 = w0(t) \cdot x0(t)$ $a1 = w1(t) \cdot x1(t)$ $y = w0(t) \cdot x0(t) + w1(t) \cdot x1(t)$ $e = y - y/|y|$ $\Delta a0 = \Delta w0(t) \cdot x0(t)$
$\quad = -\mu \bar{x}0(t) \cdot x0(t) \cdot e$ $\Delta a1 = \Delta w1(t) \cdot x1(t)$
$\quad = -\mu \bar{x}1(t) \cdot x1(t) \cdot e$ $$\Delta ai = -\mu \, wi(t) \cdot xi(t)$$

$$\Delta ai = -\mu ai^2 \cdot y^2$$
$$= -\mu(wi(t) \cdot xi(t))^2 \cdot (w0(t) \cdot x0(t) + w1(t) \cdot x1(t))^2 \cdot Xi(t)$$

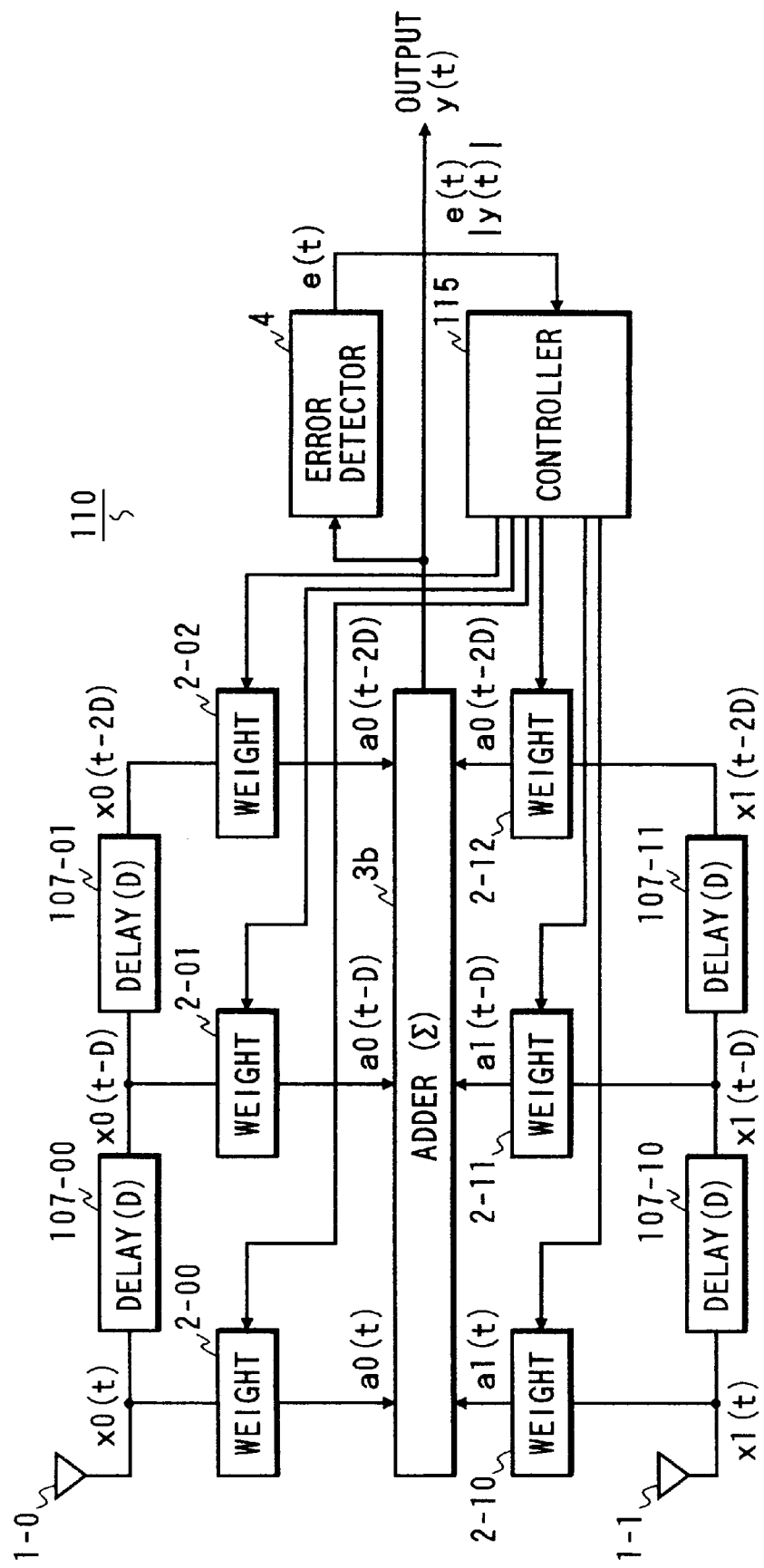

CMA-BASED ANTENNA SYSTEM

BACKGROUND OF THE INVENTION

1. Field of the Invention

The present invention relates to a radio receiver and more particularly to a CMA (constant modulus algorithm)-based antenna system.

2. Description of the Prior Art

If the amplitude of transmitted electromagnetic wave is constant as in case of, for example, frequency or phase modulated wave, then applying the CMA (constant modulus algorithm) to an array antenna system provides one of successful solutions to the problem of multipath errors. In the CMA, the weighting circuits connected with respective antennas are so controlled as to make constant the amplitude of the synthesized output signal of the adder for adding the weighted signals from the weighting circuits.

However, in the conventional CMA, the output signal may converge with phase differences among the received signals remaining as they are. This is because it is possible to converge the amplitude of the output signal to a predetermined value by increasing gains even if there are phase differences among the received signals from the antennas. Generally, the signal-to-noise ratio of the output signal of the adder decreases with increase in phase differences, becoming the maximum when the phase differences are all 0's.

Further, the conventional CMA can not cope with a case when there is any synchronous error of a symbol level or any delayed wave caused by reflection and diffraction of the transmitted wave because only the signals received at a time are added together in an antenna system provided with a synthesis controller using the conventional CMA.

SUMMARY OF THE INVENTION

It is therefore an object of the invention to provide a CMA-based antenna system showing an improved receiving performance by reducing phase differences in the received signals which have been weighted.

According to one aspect of the inventions a CMA-based antenna system comprises a plurality of antenna, weight circuits for weighting the received signals from the respective antenna, an adder for adding the weighted received signals together into a synthesized or output signals an error detector for providing an error of the output signal with respective to a predetermined reference value and a synthesis controller for controlling or deciding the weight coefficients of the weight circuits on the basis of the error. If the magnitude or the absolute value (or the modulus) of the synthesized or output signal of the adder is larger than 1, then the weight coefficients are so controlled as to reduce the magnitude of the output signal at least without increasing phase differences among the received signals.

It is another object of the invention to provide a CMA-based antenna system capable of coping with an error of symbol synchronization and a delayed wave.

According to another aspect of the invention, the received signal from each antenna is first applied to an equalizer which applies the CMA to M time-different versions of the received signal to provide an equalized version of the received signal, which is then applied to a weight circuit, thereafter being processed in the same way as in the conventional CMA-based system or in the just described CMA-based antenna system. Each of the equalizers comprises M−1 delay elements for providing the M time-different versions of the received signal and the same elements as an M-channel CMA-based antenna system as just described.

In one preferred embodiment, there is proposed a simplified form of the above described CMA-based antenna system with equalizers.

BRIEF DESCRIPTION OF THE DRAWING

Further objects and advantages of the present invention will be apparent from the following description of the preferred embodiments of the invention as illustrated in the accompanying drawings. In the drawing.

FIG. 11 is a block diagram showing an arrangement of an illustrative simplified embodiment of the CMA-based antenna system of FIG. 9.

DETAILED DESCRIPTION OF THE PREFERRED EMBODIMENTS

To facilitate a batter understanding of the present invention, a brief review of the conventional CMA will be provided. Then, the present invention will be detailed.

Conventional Constant Modulus Algorithm (CMA)

Figure 1:
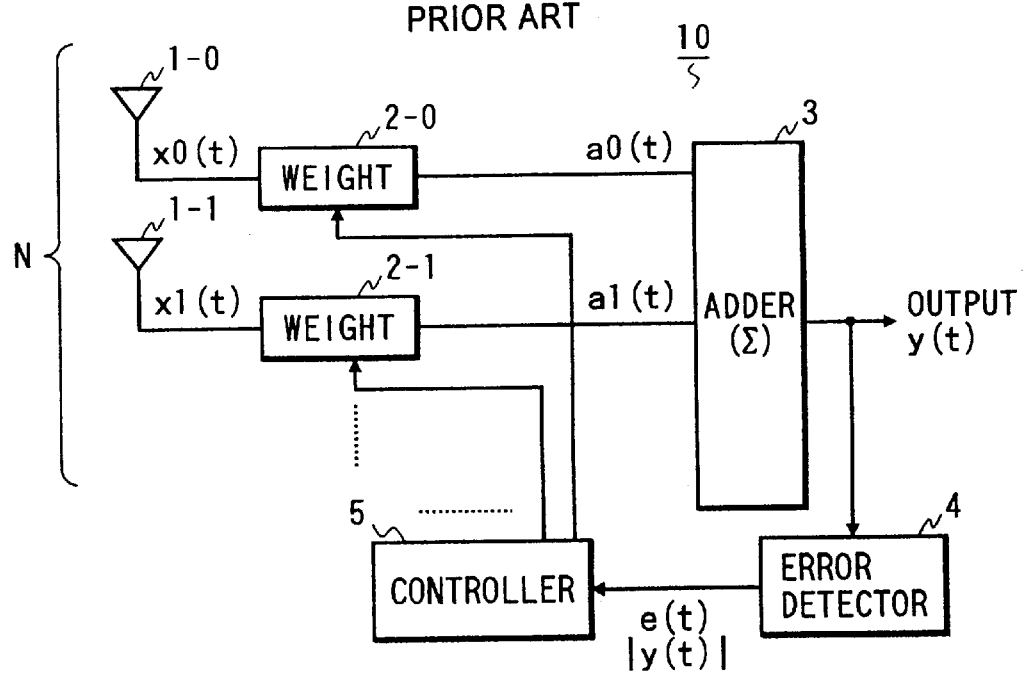
FIG. 1 is a schematic block diagram of a conventional CMA-based antenna system.

FIG. 1 is a schematic block diagram of a conventional CMA-based antenna system. In FIG. 1, the conventional CMA-based antenna system 10 comprises N antennas 1 for providing received signals; N weight circuits 2, having the inputs thereof connected with respective antennas, for each weighting a corresponding received signal, that is, each applying an amplification and a rotation to the corresponding received signal in response to a control signal; an adder 3 for adding the outputs of the weight circuits 2 to provide a synthesized output signal (vector); an error detector 4 for providing the absolute value (modulus) of the output signal vector and an error or a difference vector between the output signal vector and a reference vector with a predetermined amplitude (a unit length in this example) and the same direction as that of the output signal vector, and a synthesis controller 5, operative on the basis of the conventional CMA, for supplying each of the weight circuits 2 with the control signal for controlling the amplification factor and the rotation angle of the weight circuit 2.

For the purpose of the simplicity of the description, it is assumed that the numb er of antenna, N, is two in the following description.

In operation, each antenna 1 receives a radio wave to provide a received signal $x_i(t)$ where $x_i(t)$ is a function of time t for expressing the received signal from an i-th antenna and i=0 and 1. The received signal $x_i(t)$ is weighted by the i-th weight circuit 2 into a weighted received signal $$a_i(t)=w_i(t) \cdot x_i(t),$$

where $w_i(t)$ is a weight vectors in the form of a complex functions which, when applied to a received signal vector $x_i(t)$, scales and rotates the received signal vector $x_i(t)$. In order to use only one of the antennas 1 in the initial stage of operations the weight vectors are set as, for examples $w_0(0)=1+j0$ and $w_1(0)=0$.

The weighted received signals $a_0(t)$ through $a_N(t)$ ($a_0(t)$ and $a_1(t)$ in this example) are added together by the adder 3 into an output signal $$y(t)=w_0(t)+w_1(t) \cdot x_1(t).$$

Receiving the output y(t) the error detector 4 calculates and outputs an error signal e(t). Then, the controller 5 outputs such control signals to the weight circuits 2 as cause the amplitude or the length of the output signal vector y(t) to become a predetermined level.

The error signal e(t) shows to what extent the amplitude of the output signal y(t) differs from a predetermined amplitude and is generally defined as $$e(t)=(y(t)^m-(y(t)/|y(t)|)^m)^n.$$

However, it is hereinafter assumed that m=1 and n=1. Thus, $$e(t)=y(t)-y(t)/|y(t)|$$

By using the error vector e(t), the controller 5 determines weight functions $w_0(t+1)$ and $w_1(t+1)$ which is to be applied to the received signals from the antennas 1-0 and 1—1 at time (t+1) as follows:

$$w_0(t+1)=w_0(t)+\Delta w_0(t) \text{ and}$$
$$w_1(t+1)=w_1(t)+\Delta w_1(t).$$

The weight vector differences $\Delta w_0(t)$ and $\Delta w_1(t)$ are defined as:

$$\Delta w_0(t)=-\mu \bar{x}_0(t) \cdot e(t) \text{ and}$$
$$\Delta w_1(t)=-\mu \bar{x}_1(t) \cdot e(t),$$

where $\mu$ is a step constant indicative of the magnitude updated, and $\bar{x}_0(t)$ and $\bar{x}_1(t)$ are conjugate complex numbers of $x_0(t)$ and $X_1(t)$.

Figure 2A:
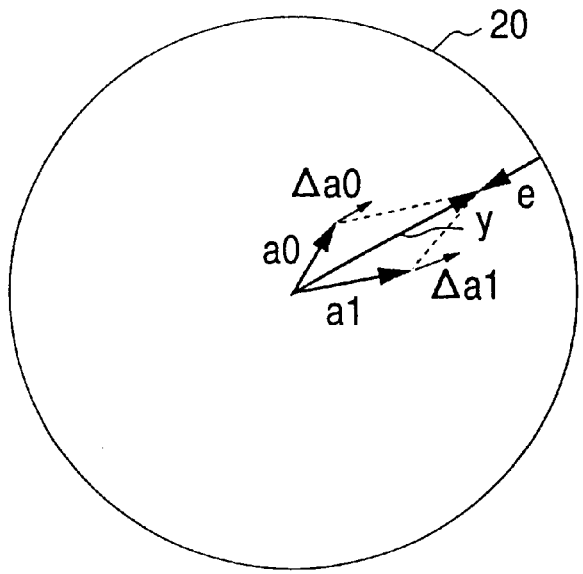
FIGS. 2A and 2B are diagrams showing, in a complex number plane, how the weighted received signals are updated (or scaled and rotated) in the antenna system of FIG. 1 if the amplitude of the output signal vector is smaller than one and if the amplitude of the output signal vector is larger than one, respectively.
Figure 2B:
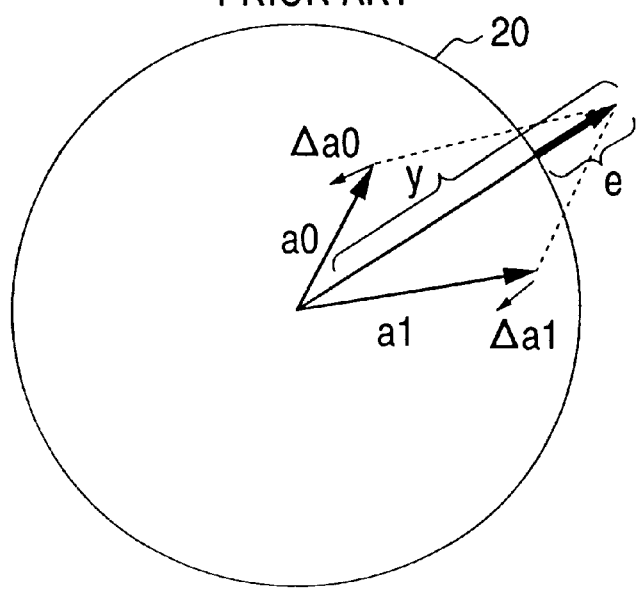

FIGS. 2A and 2B are diagrams showing, in a complex number plane, how the weighted received signals are scaled and rotated in the antenna system of FIG. 1 if the amplitude of the output signal vector is smaller than a predetermined level, e. g. 1 and if the amplitude of the output signal vector is larger than the predetermined level or 1 respectively. In FIGS. 2A and 2B, circles 20 are unit circles. Vectors a0, a1, y and e represent the weighted received signal vectors $a_0(t)$, $a_1(t)$ for the antennas 1-0 and 1—1, the output signal vector y(t) and the error vector e(t), respectively, and a vector to be added to each of the current weighted received signals in order to make e(t) zero (that is, a product of each of the current received signal, $x_i(t)$ and a difference of the weight vector $w_i(t)$ of the corresponding weight circuit 2-i, $\Delta w_i(t)$) is denoted by $\Delta a_0$ and $\Delta a_1$, which are abbreviations for $\Delta a_0(t)$ and $\Delta a_1(t)$.

If the amplitude of the vector y(t) is smaller than 1 as shown in FIG. 2A, then the error vector e(t) points toward the center of the circle 20. Updating $w_i(t)$ into $w_i(t+1)$ so as to cause the output signal vector y(t) to point onto the unit circle 20 is to add a difference vector $\Delta a_i(t)$ (=$\Delta(w_i(t) \cdot x_i(t))$) to each weighted signal $a_i(t)$. In this case, since the direction of $\Delta a_i(t)$ is the same as that of y(t), the phase difference between the two weighted signals becomes smaller and the amplitudes of the weighted signals become larger, yielding a smaller value of the error vector e(t).

On the other hand, If the amplitude of the vector y(t) is larger than one as shown in FIG. 2B, then the error vector e(t) points toward the outside of the circle 20. In this case, since the direction of $\Delta a_i(t)$ is opposite to that of y(t), though the amplitudes of the weighted signals become smaller to again yield a smaller value of the error vector e(t), the phase difference between the two weighted signals disadvantageously becomes larger.

In a conventional CMA, the above described process is repeated, thereby causing the amplitude of the output signal to become constant with the error vector e(t) converging to 0.

Inventive CMA-based Antenna System

Figure 3:
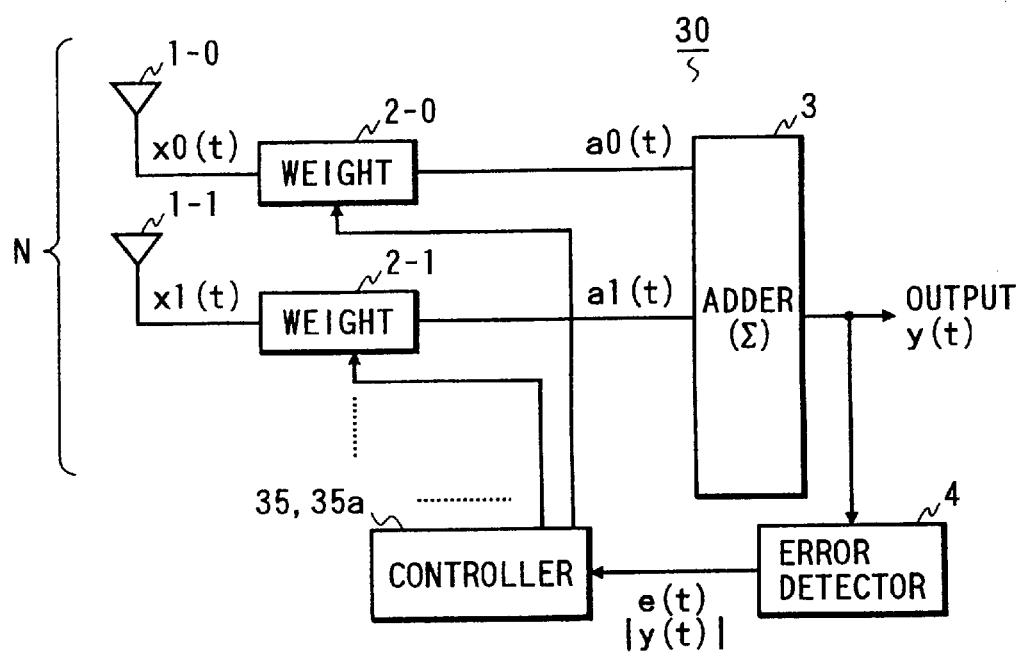
FIG. 3 is a schematic block diagram showing an arrangement of an illustrative embodiment of a CMA-based antenna system permitting the output to quickly converge to a predetermined level without increasing phase differences among the weighted received signals according to the principles of the invention.

FIG. 3 is a schematic block diagram showing an arrangement of an illustrative embodiment of a CMA-based antenna system permitting the output to quickly converge to a predetermined level without increasing phase differences among the weighted received signals according to the principles of the invention. In FIG. 3, the CMA-based antenna system 30 is identical to that 10 of FIG. 1 except that the synthesis controller 5 has been replaced with a synthesis controller 35 in FIG. 3. Since the other elements 1 through 4 are identical to those of FIG. 1, their description will be omitted. It is also assumed that the number (N) of antenna is two. The description of synthesis controller 35 will be given below.

In the same manner as in the conventional system, the controller 35 calculates the weight function at time (t+1) as follows:

$$w_0(t+1)=w_0(t)+\Delta w_0(t) \text{ and}$$
$$w_1(t+1)=w_1(t)+\Delta w_1(t),$$

where $\Delta w_i(t)$ is a difference vector of the weight vectors at times t and (t+1) and is defined by:

$$\Delta w_i(t) = \begin{cases} -\mu \bar{x}_i(t) \cdot e(t), & \text{if } |y(t)| < 1 \\ -\mu w_i(t), & \text{if } |y(t)| > 1. \end{cases} \quad (1)$$

Figure 5:
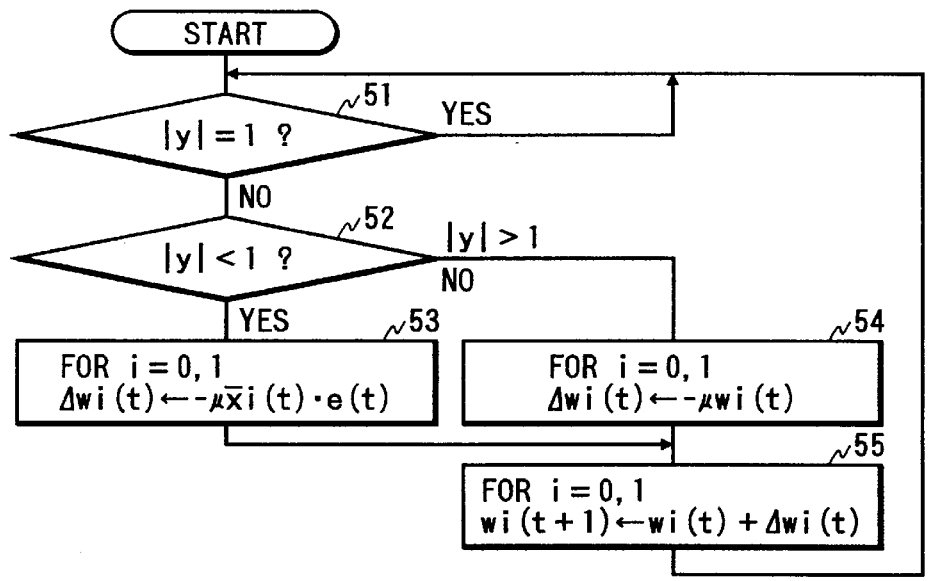
FIG. 5 is a flow chart of a process by the synthesis controller 35 including the updating process of FIG. 4.

FIG. 5 is a flow chart of a process in which the controller 35 controls the weight functions of the weight circuits 2 so as to maintain the phase difference between the weighted received signals according to the principles of the invention. In FIG. 5, the controller 35 makes a check in step 51 to see If the absolute value (the modulus) of the output signal vector y(t) is a predetermined level, e. g. 1. If so, since this means that there is no need of changing the weight functions of the weight circuits 2, the controller 35 simply returns to step 51 to check the next value of y(t). If the modulus of y(t) is not 1 in step 51, then the controller 35 makes another check in step 52 to see if the modulus of y(t) is smaller then 1, then the controller 35 updates the weight function $w_i(t)$ in the same way as in the conventional system, that is, calculates $\Delta w_i(t) = -\mu \bar{x}_i(t) \cdot e(t)$ in step 53.

Figure 4:
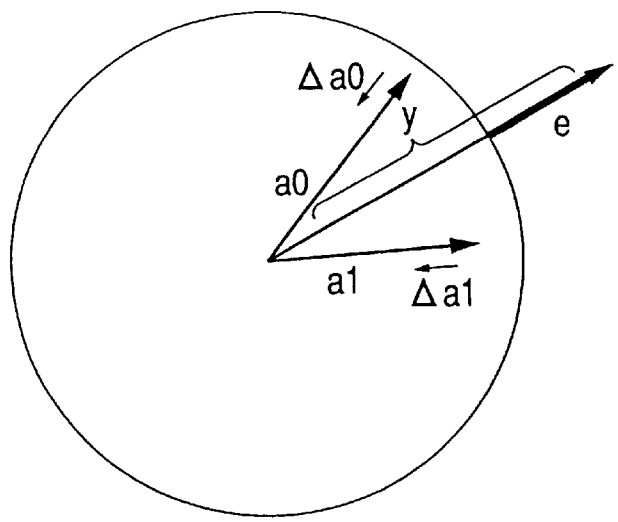
FIG. 4 is a diagram showing, in a complex number plane, how the weighted received signals are so updated as to maintain the phase difference between the weighted signals in the antenna system of FIG. 3 in case when the amplitude of the output signal vector is larger than 1.

If the test result is NO or $|y(t)| > 1$ in step 52, then in step 54 the controller 35 controls the weight function such that the received signal $x_i(t)$ has only the amplitude thereof scaled down with the phase angle being unchanged as shown in FIG. 4, that is, calculates $\Delta w_i(t) = -\mu w_i(t)$. After step 53 or 54, the controller 35 updates the weight circuits 2 by adding a calculated $\Delta w_i(t)$ to the corresponding weight circuit 2-i in step 559 and then returns to step 51.

By doing this, the phase differences among the received signals (the phase difference between the received signals in this example) remains unchanged before and after the weighting process. This contributes to a higher signal-to noise ratio.

It is also possible to update the weight circuits 2 so as to reduce the phase difference between the weighted received signals In case when the amplitude of the output signal is larger than 1.

Figure 6:
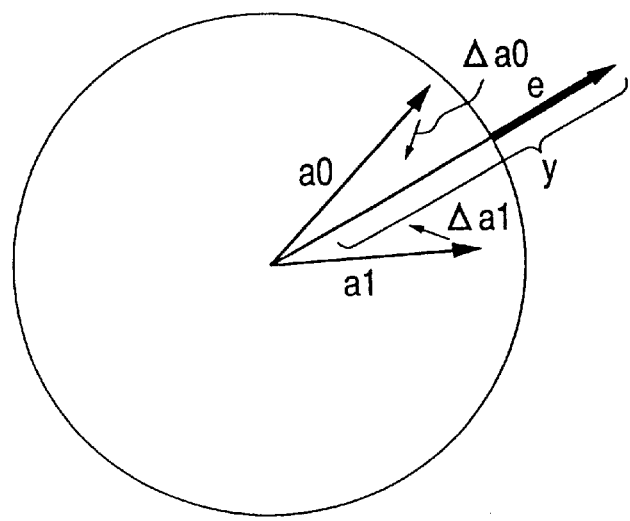
FIG. 6 is a diagram showing, in a complex number plane, how the weighted received signals are so updated as to reduce the phase difference between the weighted signals in the antenna system of FIG. 3 in case when the amplitude of the output signal vector is larger than 1.
Figure 7:
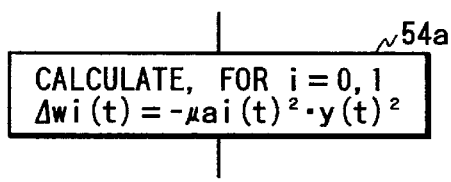
FIG. 7 shows a step which is to be replaced with the step 54 of FIG. 5 if the updating process shown in FIG. 6 is to be used.

FIG. 6 is a diagram showing, in a complex number plane, signal vectors in such an updating process. If the amplitude of the output signal is larger than 1 as shown in FIG. 6, the weighted received signals $a_0(t)$ and $a_1(t)$ are so updated as to reduce the phase difference between the signals $a_0(t)$ and $a_1(t)$. In order to realize this, the step 54 of calculating $\Delta w_i(t)$ of FIG. 5 has only to be replaced with a step 54a shown in FIG. 7. In step 54a, the controller 35 calculates $$\Delta w_i(t) = -\mu a_i(t)^2 \cdot y(t)^2$$
$$= -\mu (w_i(t) \cdot x_i(t))^2 \cdot (w_0(t) \cdot x_0(t) + w_1(t) \cdot x_1(t))^2.$$

By doing this, the phase difference between the received signals is reduced through a weighting process caused by an output signal larger than 1, which contributes to a higher signal-to noise ratio.

Figure 8:
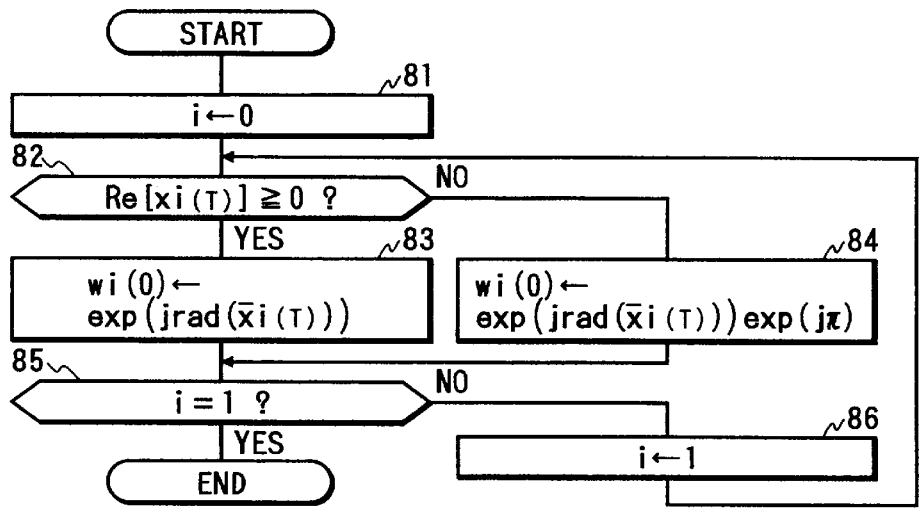
FIG. 8 is a flow chart of an initial process in which the synthesis controller 35 sets initial values to the weight circuits 2.

FIG. 8 is a flow chart of an initial process in which the synthesis controller 35 sets initial values to the weight circuits 2. In order to shorten the time it takes for the amplitude of the output signal y(t) to converge on a predetermined level (1 in this example), the synthesis controller 35 uses, as initial values nearer to the convergence points the phase of the conjugate complex number of a received signal $x_i(T)$ which provides the maximum electric power, where T is a time for which the received signal $x_i(t)$ takes the maximum value. The time T can be found in each time slot or each burst for example in a TDMA (time division multiple access) system. Basically, the initial weight function $w_i(0)$ is set as $w_i(0) = \exp(j \mathrm{rad}(\bar{x}_i(T)))$.

However, if the real parts of $x_0(T)$ and $x_1(T)$ have different signs, then the weighted received signal vector $a_i(t)$ will point toward the opposite direction to the received signal vector $x_i(t)$. In order to avoid this, it is preferable to further rotate the received signal by a $\pi$ radian. That is, the controller 35 sets the initial weight function $w_i(0)$ as follows.

$$w_i(0) = \begin{cases} \exp(j \mathrm{rad}(\bar{x}_i(T))), & \text{if } Re[x_i(T)] \geq 0, \\ \exp(j \mathrm{rad}(\bar{x}_i(T))) \cdot \exp(j \pi), & \text{if } Re[x_i(T)] < 0. \end{cases}$$

In FIG. 8, the controller 35 set i for 0 in step 81. In the next step 82, the controller 35 checks the real part of the $x_0(T)$ to see if the real part is zero or more. If so, then the controller 35 proceeds to step 83, where the initial weight function $w_0(t)$ Is set for $\exp(j \mathrm{rad}(\bar{x}_0(T)))$ and otherwise proceeds to step 84, where the initial weight function $w_0(t)$ is set for $\exp(j \mathrm{rad}(\bar{x}_0(T))) \cdot \exp(j \pi)$. After step 83 or 84, the controller 35 makes a check in step 85 to see if i=1. If so, the controller 35 ends the process, and otherwise proceeds to step 86 to set i for 1 and return to step 82. Thereafter, the controller 35 executes the just described process for i=1.

Figure 9:
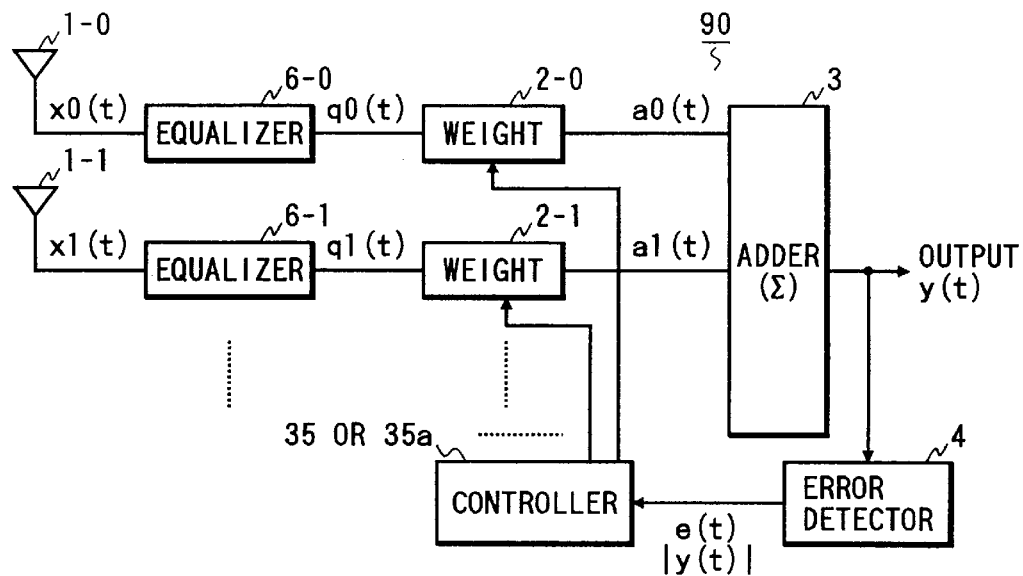
FIG. 9 is a schematic block diagram showing an arrangement of an illustrative embodiment of a CMA-based antenna system which is useful even in case when there is any symbol synchronization error or any delayed wave.

FIG. 9 is a schematic block diagram showing an arrangement of an illustrative embodiment of a CMA-based antenna system which is useful even in case when there is any symbol synchronization error or any delayed wave. In FIG. 9, the CMA-based antenna system 90 is the same as that of FIG. 3 except that an equalizer 6-i for applying an equalization to a received signal from each antenna 1-i to provide an equalized received signal has been inserted between each antenna 1-i and the associated weight circuit 2. The other elements of FIG. 9 are identical to those of FIG. 3, so their descriptions will be omitted. The controller of this embodiment may be either of the above described controllers 35 and 35a.

The equalization is achieved by including, in the equalized received signal from the equalizer, past versions of the received signal from the corresponding antenna so as to make the equalized received signal equal to a preset received signal level.

Figure 10:
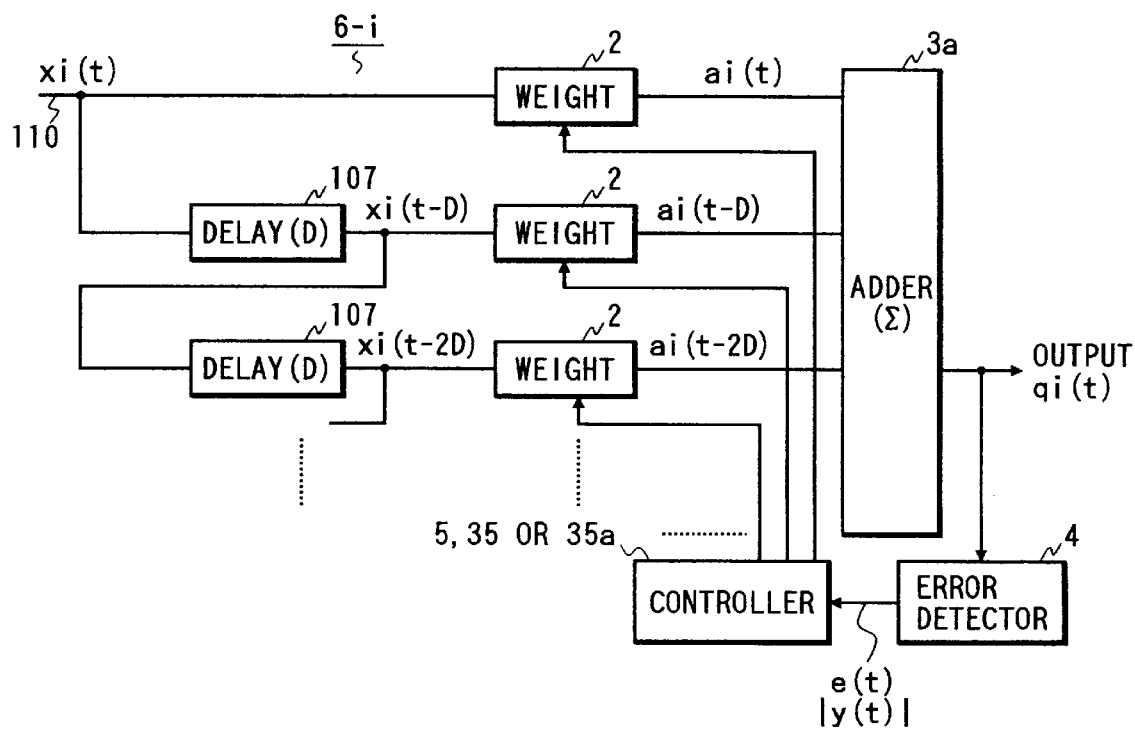
FIG. 10 is a block diagram showing an arrangement of an equalizer of the CMA-based antenna system of FIG. 9.

FIG. 10 shows the details of the equalizer 6 of the CMA-based antenna system of FIG. 9. The arrangement of the equalizer 6 is again very similar to that of the CMA-based antenna system 30 of FIG. 3. An input of each weight circuit 2 of FIG. 3 is connected to a corresponding antenna, whereas the inputs of the weight circuits 2 of FIG. 10 are connected to an input terminal 110 (i.e. an antenna 1) the output of the first delay element 107 with its input connected to the input terminal 110, the output of the second delay element 107 with its input connected to the first delay element 107 and so on.

For the purpose of the simplicity of descriptions it is assumed that there are two delay elements 107 and three weight circuits 2, and that the sampling period of the received signal and the delay time D of the delay elements 107 is equal to half of the symbol interval of the received signal. However, it is also possible to enhance the performance of the equalizer 6 by increasing the delay elements 107 in number and/or reducing the sampling period and the delay time (D) of the delay elements 107.

The equalizer 6 operates under the control of any of the above described synthesis controllers 5, 35 and 15a so as to reproduce a received signal of an appropriate time from t to (t−2D) from the signals $x_i(t)$, $x_i(t−D)$ and $x_i(t−2D)$ on the basis of any of the above described CMAs.

Though synthesis controllers have been use for the received signals from a plurality of antennas, a synthesis controller can be used in combination with delay elements for synthesizing the signals which have been delayed by respective numbers of delay elements to serve as an equalizer. Thus, the CMA-based antenna system 90 of FIG. 9 is useful even when there is any symbol synchronization error or any delayed wave in the received signals from the antennas 1.

FIG. 11 is a block diagram showing an arrangement of an illustrative simplified embodiment of the CMA-based antenna system of FIG. 9. In FIG. 9, the CMA-based antenna system 110 comprises two antennas 1; serially-connected first and second delay elements 107 having the input of the first delay element connected with each of the antennas 1; 6 weight circuits 2-i0, 2-i1 and 2-i2 having the input thereof connected to the antenna 1-i and the output terminals of the two delay elements 107-i0 and 107-i1 in each antenna 1-i circuit, respectively (i=0 and 1); an adder 3b having the output terminals thereof connected with respective output terminals of the 6 weight circuits 2; the error detector 4 having the input thereof connected with the output of the adder 3b; and a controller 115 having the input thereof connected with the error detector 4 output and the output terminals thereof connected with the inputs of the associated weight circuits 2.

In each antenna 1-i circuits the received signal $x_i(t)$ from an antenna 1-i is delayed by the first and second delay circuit 107-i0 and 107-i1, which yields received signals of D sec ago and 2D sec ago, $x_i(t-D)$ and $x_i(t-2D)$, respectively. The received signal samples $x_i(t)$, $x_i(t-D)$ and $x_i(t-2D)$ are supplied to the weight circuits 2-i0, 2-i1 and 2-i2, respectively, which scale and rotate the samples to yield weighted samples $a_i(t)$, $a_i(t-D)$ and $a_i(t-2D)$, which are summed into an output signal y(t). The output signal y(t) has the modulus thereof compared with a predetermined amplitude by the error detector 4, which outputs the difference as an error signal. In response to the error signal, the controller 115 controls the scale factor and the rotation angle of the weight function of each of the weight circuits 2-i0 through 2-i2.

Though this illustrative embodiment has used two delay elements 107 and three weight circuits 2, it is also possible to enhance the performance of the antenna system 110 of FIG. 11 by increasing the delay elements 107 in number and/or using a shorter sampling period and a shorter delay time (D) of the delay elements 107.

Though the present invention has been described in terms of some illustrative embodiments, it is apparent to those of ordinary skill in the art that other various arrangements may be constructed without departing from the spirit and scope of the present invention.

For examples "1" has been used as the predetermined amplitude or level in the error detection in the above illustrative embodiments. However, the predetermined amplitude may be any real number, e.g. α. In this case, the error signal vector e (t) is given as $$e(t) = y(t) - \alpha y(t)/|y(t)|$$
$$= y(t) \cdot (1 - \alpha/|y(t)|).$$

It should be therefore understood that the present invention is not limited to the specific embodiments described in the specification, but rather be construed broadly within its spirit and scope as defined by elements set out in the appended claims.

What is claimed is:

1. A system for synthesizing received signals from a plurality (N) of antennas arranged apart from one another, the system comprising:

N first means, each applying an equalization to a received signal from an associated antenna by including, in the equalized output thereof, past versions of said received signal so as to make said equalized output equal to a preset received signal level;

N second means, connected with respective N first means and responsive to respective control signals, for scaling and rotating respective equalized outputs from respective first means and supplying respective weighted signals;

means for summing said respective weighted signals into a synthesized output;

means for supplying, as an error signal, a difference vector which equals said synthesized output minus a difference vector with a predetermined magnitude and the same direction as that of said synthesized output; and means, responsive to said error signal from said means for supplying a difference, for supplying said N second means with said respective control signals for reducing increase of phase difference among said respective weighted signals.

2. A system as defined in claim 1, wherein said means for supplying a difference vector further comprises means for passing an absolute value comprising a modulus of said synthesized output to said means for supplying said N second means, and wherein said means for supplying said N second means with said respective control signals comprises means activated in case when said modulus is smaller than said predetermined magnitude for supplying said N second means with said respective control signals so as to reduce only the magnitude of said scaling.

3. A system as defined in claim 1, wherein said means for supplying said N second means with said respective control signals comprises means for supplying said N second means with said respective control signals for reducing phase differences among said respective weighted signals.

4. A system as defined in claim 1, wherein said means for supplying said N second means with said respective control signals further comprises means activated at the beginning of operation of the system for supplying said N second means with said respective control signals such that said N second means rotate said received signals by the phase angle of the conjugate complex number of said received signal of the time for which the modulus of said received signal takes a maximum value.

5. A system for synthesizing received signals from a plurality (N) of antennas arranged apart from one anther, the system comprising:

N means responsive to respective control signals for scaling and rotating said received signals from respective antennas and supplying respective weighted signals;

means for summing said respective weighted signals into a synthesized output;

means for supplying, as an error signal, a difference vector which equals said synthesized output minus a reference vector with a predetermined magnitude and the same direction as that of said synthesized output;

means, responsive to said error signal from said means for supplying a difference, for supplying said N means with said respective control signals so as not to cause any phase difference among said respective weighted signals to increase, further comprising means, disposed before each of said N means for scaling and rotating said received signals, for applying an equalization to a received signal from an antenna associated with said each of said N means by including, in the equalized output thereof, past versions of said received signal so as to make said equalized output equal to a preset received signal level.

6. A system as defined in claim 5, wherein said means for applying an equalization comprises:

a plurality (M−1) of means connected in series, each of said M−1 means delaying an input signal thereto by a delay time to supply a delayed signal, the input signal of the first one of said M−1 means being one of said received signals;

a plurality (M) of means responsive to respective coefficient control signals for scaling and rotating said one of said received signals and said delayed signals from said M−1 means connected in series and supplying respective delayed weighted signals;

means for summing said respective delayed weighted signals into said equalized output;

means for supplying, as an error signal, a difference between the modulus of said equalized output and a predetermined level; and means, responsive to said error signal from said means for supplying a difference, for supplying said M means with said respective coefficient control signals so as to cause said equalized output to coincide with said predetermined level.

7. A system for synthesizing received signals from a plurality (N) of antennas arranged apart from one anther, the system comprising:

N antenna circuits connected with respective antennas, each of said N antenna circuits providing a plurality (M) of weighted versions of an associated one of said received signals;

each of said N antenna circuits comprising:

a plurality (M−1) of means connected in series, each of said M−1 means delaying an input signal thereto by a delay time to supply a delayed signal, the input signal of the first one of said M−1 means being supplied from one of said N antennas; and a plurality (M) of means responsive to respective control signals for scaling and rotating a signal from said one of said N antennas and said delayed signals from said M−1 means connected in series and supplying said M weighted versions;

means for summing said M×N weighted versions from N antenna circuits in to a synthesized output vector;

means for supplying a modulus of said synthesized output vector and an error vector which equals said synthesized output minus a reference vector with a predetermined magnitude and the same direction as that of said synthesized output; and means, responsive to said modulus and said error vector from said means for supplying a difference, for supplying said M×N scaling and rotating means with said respective control signals so as to cause said synthesized output to coincide with said predetermined value and so as not to cause any phase difference among said M×N weighted versions to increase.

* * * * *